(12) United States Patent
Yeh

(10) Patent No.: US 6,767,387 B2
(45) Date of Patent: Jul. 27, 2004

(54) APPARATUS AND METHOD FOR REMOVING PARTICLES FROM GAS EXPELLED DURING HEAT TREATMENT PROCESS

(75) Inventor: Chia Chi Yeh, Tainan (TW)

(73) Assignee: Nanya Technology Corporation, Taoyuan (TW)

( * ) Notice: Subject to any disclaimer, the term of this patent is extended or adjusted under 35 U.S.C. 154(b) by 121 days.

(21) Appl. No.: 09/948,490

(22) Filed: Sep. 6, 2001

(65) Prior Publication Data

US 2002/0108496 A1 Aug. 15, 2002

(30) Foreign Application Priority Data

Feb. 9, 2001 (TW) ........................................ 90102989 A

(51) Int. Cl.⁷ .............................................. B01D 47/06
(52) U.S. Cl. ............................ 95/149; 96/271; 96/273; 96/320
(58) Field of Search ...................... 95/149, 224; 96/243, 96/270, 273, 271, 277, 280, 320; 261/118

(56) References Cited

U.S. PATENT DOCUMENTS

| | | | | |
|---|---|---|---|---|
| 420,378 | A | * | 1/1890 | Dye |
| 2,781,251 | A | * | 2/1957 | Howell |
| 3,086,537 | A | * | 4/1963 | Sieger |
| 4,452,614 | A | * | 6/1984 | Kovac |
| 4,508,555 | A | * | 4/1985 | Baduel |
| 4,954,136 | A | * | 9/1990 | Jokisch et al. |
| 4,973,337 | A | * | 11/1990 | Jokisch et al. |
| 5,131,757 | A | * | 7/1992 | Smith |
| 5,759,498 | A | * | 6/1998 | Sheu et al. |
| 5,855,822 | A | * | 1/1999 | Chen |
| 5,972,078 | A | * | 10/1999 | Collins et al. |
| 6,010,576 | A | * | 1/2000 | Lin |
| 6,119,299 | A | * | 9/2000 | Lin |
| 6,187,080 | B1 | * | 2/2001 | Ping-Chung et al. |
| 6,217,640 | B1 | * | 4/2001 | Lu et al. |
| 6,261,524 | B1 | * | 7/2001 | Herman et al. |
| 6,527,828 | B2 | * | 3/2003 | Flippo et al. |
| 2002/0108496 | A1 | * | 8/2002 | Yeh |
| 2003/0024389 | A1 | * | 2/2003 | Flippo et al. |

* cited by examiner

*Primary Examiner*—Duane S. Smith
(74) *Attorney, Agent, or Firm*—Ladas & Parry

(57) ABSTRACT

A gas treatment device comprises an oxygen-mixed unit, a treatment unit, a working fluid and a sprayer. The sprayer has an inner wall and a plurality of nozzles circumferentially arranged on the inner wall. The nozzles are used for outputting the working fluid to form a filtering region so that the particles can be easily and efficiently removed.

23 Claims, 4 Drawing Sheets

Figure 1:
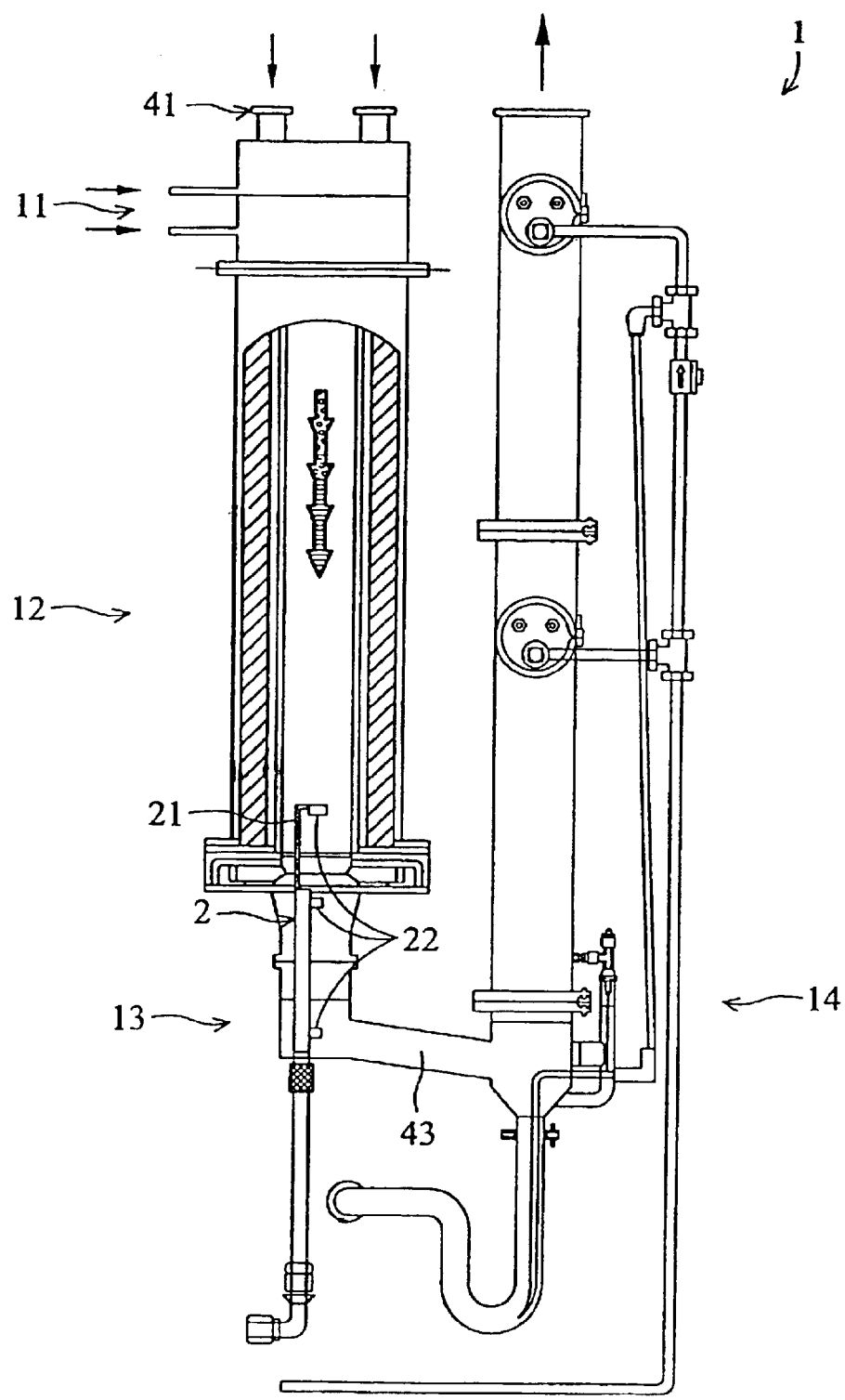
Figure 2:
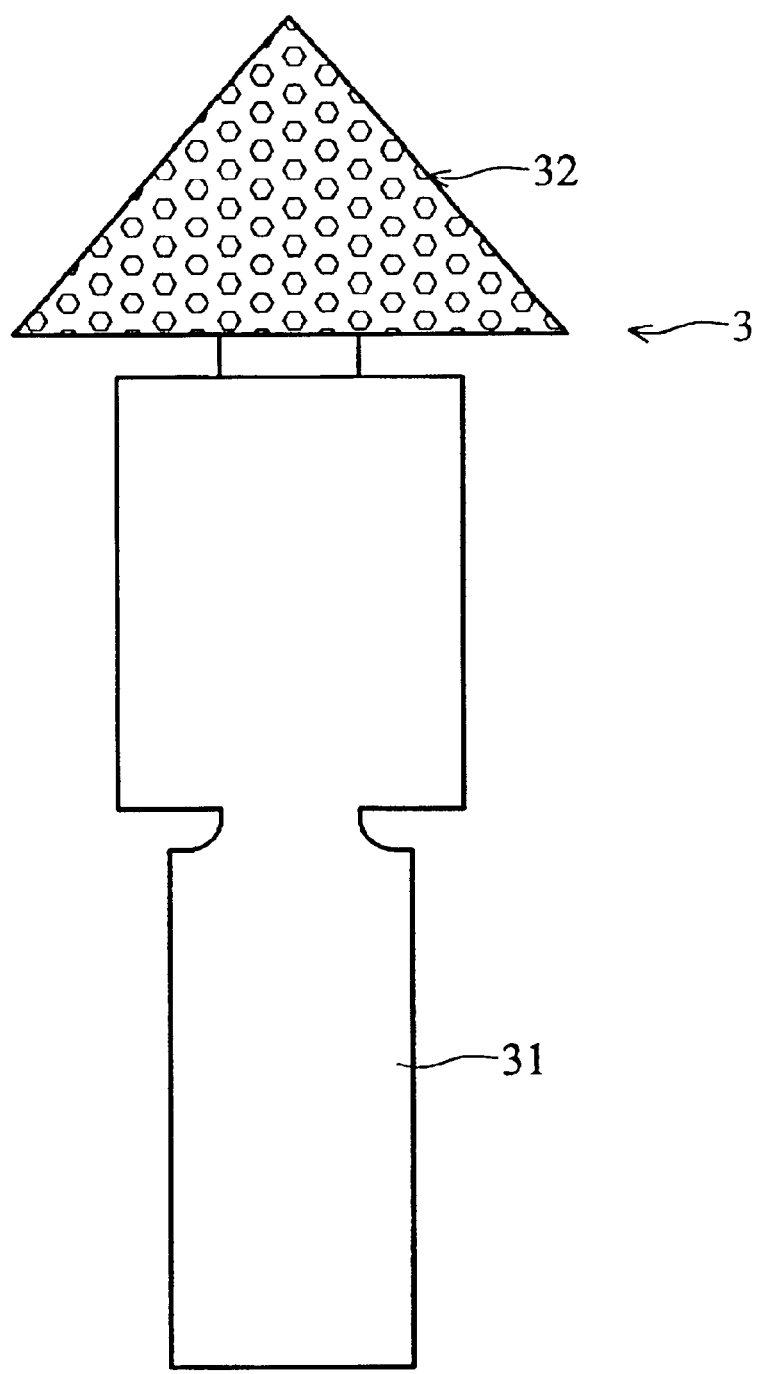
Figure 3:
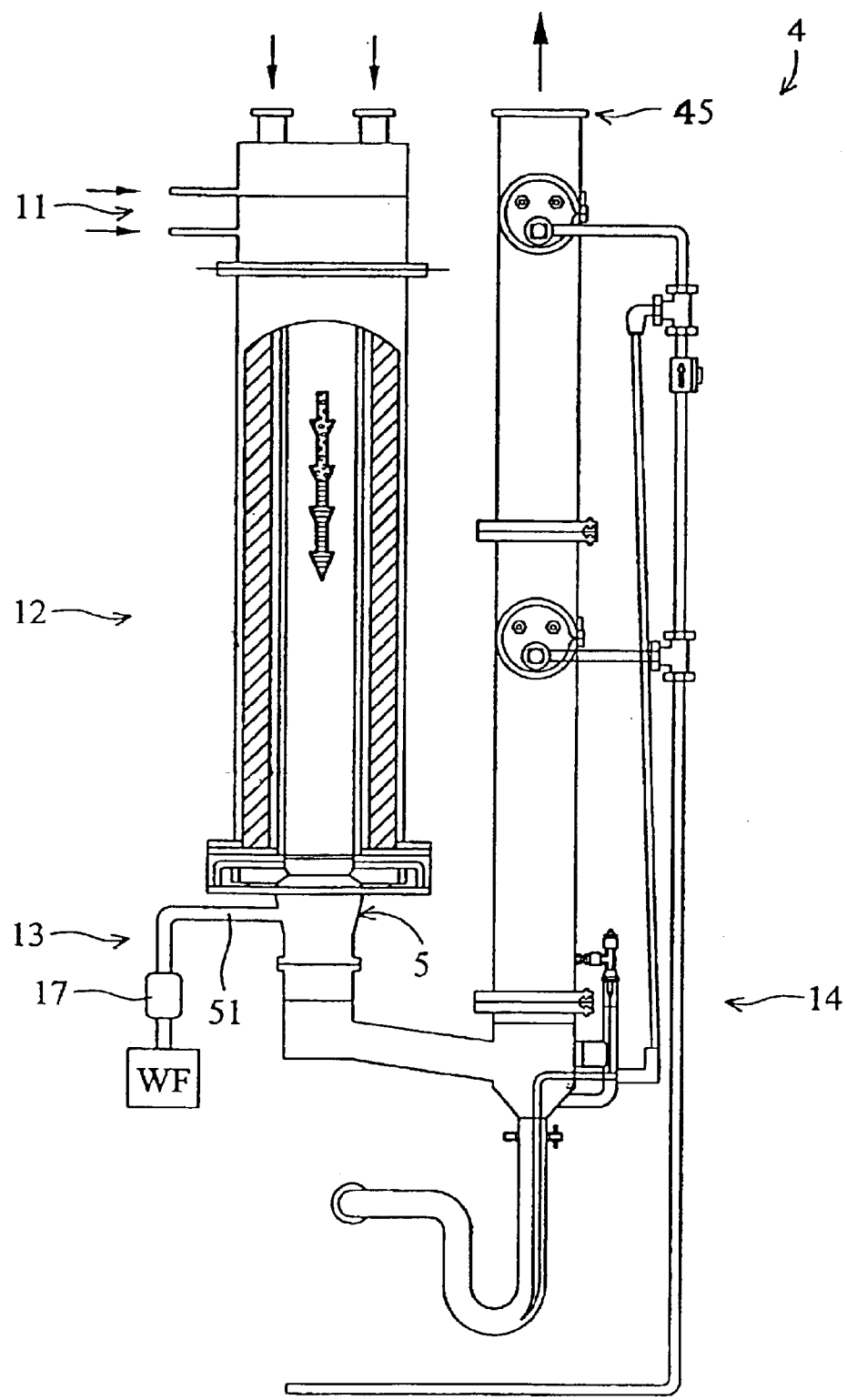
Figure 4:
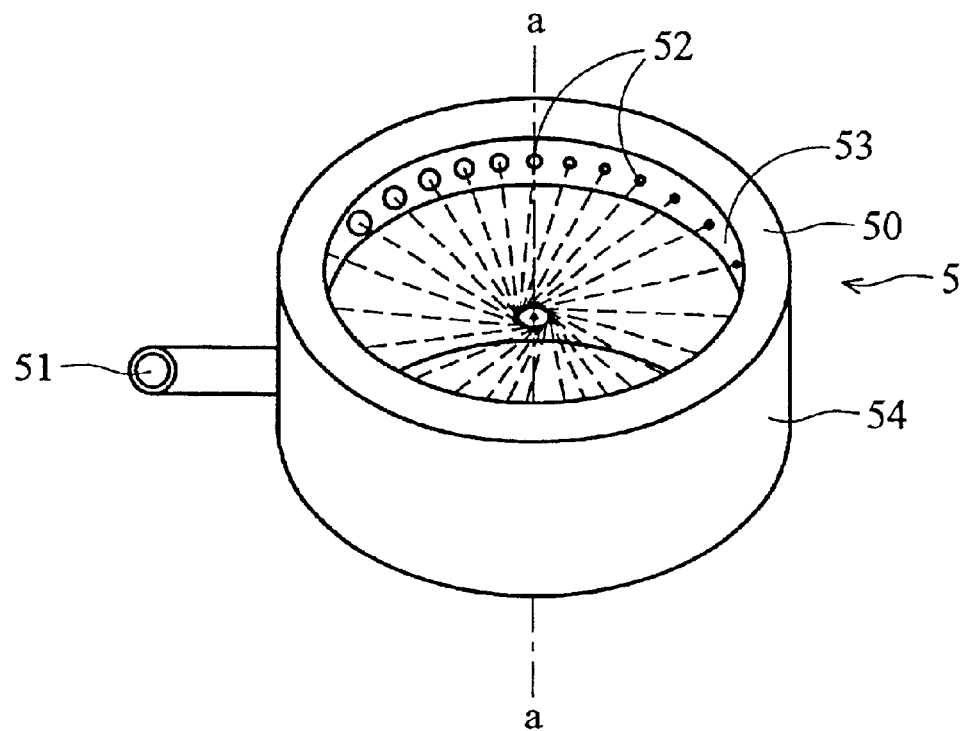
Figure 5:
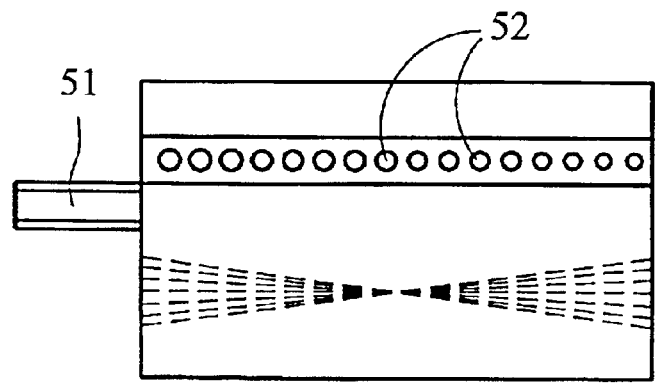

APPARATUS AND METHOD FOR REMOVING PARTICLES FROM GAS EXPELLED DURING HEAT TREATMENT PROCESS

BACKGROUND OF THE INVENTION

1. Field of the invention

This invention relates to a gas treatment device. More particularly, this invention relates to a device for removing particles from a gas expelled during heat treatment process.

2. Description of Prior Art

Referring to FIG. 1, a gas treatment device 1 comprises an oxygen-mixed unit 11, a treatment unit 12, a first cooling/cleaning unit 13 and a second cooling/cleaning unit 14. The oxygen-mixed unit 11 is disposed at the upstream region of the treatment unit 12 and connected to equipment, for example, a semiconductor-processing device (not shown in figure) via a pipe 41. The pipe 41 transmits exhaust gas expelled from the semiconductor-processing device to the treatment unit 12 so as to proceed a series of heat treating steps. The first cooling/cleaning unit 13 and the second cooling/cleaning unit 14 are sequentially disposed in the exit of the treatment unit 12, and the first cooling/cleaning unit 13 is connected to the second cooling/cleaning unit 14 through a tube 43. By mixing with oxygen from the oxygen-mixed unit 11, lots of particles, i.e., oxidation, are generated within the treatment unit 12. The two cooling/cleaning unit 13, 14 are then used for proceeding a series of cooling and cleaning steps on the gas expelled from the treatment unit 12.

In the first cooling/cleaning unit 13, a sprayer 2 connected with a pipe 21 is provided. The sprayer 2 comprises a plurality of nozzles 22 disposed on the pipe 21 and located at the path of the gas expelled from the treatment unit 12. As a working fluid is transmitted into the sprayer 2 and outputted by the nozzles 22, particles in the gas can be immediately cooled and fallen down.

However, the fallen particles are gradually formed cakes stuck on the inner wall of the pipe 43 with the time, and it is inconvenient for cleaning the cakes by taking apart the pipe 43 from the other related elements in the gas treatment device 1. Further, the pipe 21 connected to the sprayer 2 is located at the exit of the treatment unit 12, and the pipe 21 is easily deformed by the expelled gas with high temperature.

FIG. 2 is a plan view showing a sprayer 3 according to another prior art, and the sprayer 3 also can be applied in the cooling/cleaning unit 13.

The sprayer 3 comprises a pipe 31 and a conical head 32 connected to the pipe 31. The conical head 31 is formed with openings used as nozzles for spraying water transmitted by the pipe 31. Although the particles in the gas can be removed by the spraying water from the conical head 32, but the pipe 31 and the conical head 32 located at the exit of the treatment unit 12 is also deformed by the expelled gas with high temperature.

SUMMARY OF THE INVENTION

To solve the above problem, the primary object of this invention is to provide a gas treatment device with a sprayer so as to remove particles from a gas expelled during a treatment process. The gas treatment device comprises a treatment unit, a working fluid and a sprayer. The treatment unit is used for proceeding heat treatment process and certainly producing a gas containing harmful particles. The gas is expelled out of the treatment unit and flowing along a path such as a pipe. The sprayer has a hollow body provided with an inner wall and a plurality of nozzles circumferentially arranged on the inner wall. The nozzles are used for outputting the working fluid to form a filtering region in the path and the working fluid outputted from the nozzles are individually reached to the inner wall, so that the particles can be easily and efficiently removed from the gas.

BRIEF DESCRIPTION OF THE DRAWINGS

The present invention can be more fully understood by reading the subsequent detailed description and examples with reference made to accompanying drawings in which:

FIG. 1 is a sectional view partially showing a gas treatment device (1) according to a prior art.

FIG. 2 is a plan view showing a sprayer (3) according to another prior art.

FIG. 3 is a sectional view partially showing a gas treatment device (4) according to an embodiment of the present invention.

FIG. 4 is a perspective view showing a sprayer (5) being applied on the gas treatment device (4) of FIG. 3.

FIG. 5 is a sectional view showing the inner structure of the sprayer (5) along an axis (a—a) to of FIG. 3.

DETAILED DESCRIPTION OF THE PREFERRED EMBODIMENTS

Referring to FIG. 3, a gas treatment device 4 comprises an oxygen-mixed unit 11, a treatment unit 12, a first cooling/cleaning unit 13 and a second cooling/cleaning unit 14. The oxygen-mixed unit 11 is disposed at the upstream region of the treatment unit 12 and connected to equipment, for example, a semiconductor-processing device (not shown in figure) via a pipe 41. The pipe 41 transmits exhaust gas expelled from the semiconductor-processing device to the treatment unit 12 so as to proceed a series of heat treating steps. By mixing with oxygen from the oxygen mixed unit 11, lots of particles, i.e., oxidation, are generated within the treatment unit 12. The first cooling/cleaning unit 13 and the second cooling/cleaning unit 14 are sequentially disposed in the exit of the treatment unit 12, and the first cooling/cleaning unit 13 is connected to the second cooling/cleaning unit 14 through a tube 43. The two cooling/cleaning unit 13, 14 are used for proceeding a series of cooling and cleaning steps on the gas expelled from the treatment unit 12.

In the first cooling/cleaning unit 13, a sprayer 5 connected with an inlet pipe 51 and a pump 17 is provided, and the structure of the sprayer 5 is shown in FIG. 4. A working fluid WF is energized and transmitted into the sprayer 5 through the inlet pipe 51 by the pump 17. The sprayer 5 has a plurality of nozzles 52 arranged around an axis a—a and a hollow body 50 provided with an inner cylindrical wall 53 and an outer cylindrical wall 54, and the inlet pipe 51 is connected to the body 50. The nozzles 52 are circumferentially and asymmetrically arranged on the inner wall 53 with respect to the axis a—a, and the outlet of each nozzle 52 is faced toward the inner wall 53. As the pump 17 energizes the working fluid, water columns outputted from all the nozzles can reach the inner wall 53 so as to form a filtering region within the body 50, and there is no interference among all water columns.

Therefore, the filtering region can easily and efficiently capture the particles in the gas expelled from the treatment unit 12, and then the mixture containing particles and the working fluid is drawn to a processor for advancing treatment. Then, the filtered gas is transmitted into the second cooling/cleaning unit 14 for proceeding further cooling and cleaning step, and then it is drawn out of the second cooling/cleaning unit 14 through an outlet 45.

In the present embodiment, the nozzle has a first injection angle downwardly with respect to both the axis a—a and the horizontal plane, preferably at the range of 40 to 50 degrees, wherein the nozzles have diameters which vary from a relatively small diameter to a relatively large diameter along the inner cylindrical wall. Also, the nozzle has a second injection angle with respect to a coplanar surface formed by the axis a—a and that nozzle itself, preferably at the range of 3 to 10 degrees.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for removing particles from a gas expelled during a treatment process by a working fluid, comprising the processes of:

spraying the working fluid to form a filtering region by a plurality of nozzles which are circumferentially arranged about an axis of an inner cylindrical wall and have a first injection angle with respect to a horizontal plane containing at least one of the nozzles at the range of 40 to 50 degrees, wherein the nozzles have diameters which vary from a relatively small diameter to a relatively large diameter along the inner cylindrical wall; and inducing the gas passed through the filtering region so that the particles are removed by the working fluid outputted from the nozzles.

2. The method for removing particles from a gas expelled during a treatment process by a working fluid as claimed in claim 1, wherein the nozzles are disposed in a heat treatment device.

3. A method for removing particles from a gas expelled during a treatment process by a working fluid, comprising the processes of:

spraying the working fluid to form a filtering region by a plurality of nozzles which are circumferentially arranged about an axis of an inner cylindrical wall and having a first injection angle with respect to a horizontal plane containing at least one of the nozzles, the first injection angle being in a range of 40 to 50 degrees; and inducing the gas passed through the filtering region so that the particles are removed by the working fluid outputted from the nozzles, wherein the nozzles have a second injection angle with respect to the axis, the second injection angle being in a range of 3 to 10 degrees.

4. The method for removing particles from a gas expelled during a treatment process by means of a working fluid as claimed in claim 1, wherein the working fluid is water.

5. An apparatus for removing particles from a gas expelled during a treatment process by a working fluid, comprising:

a sprayer having an inner cylindrical wall and a plurality of nozzles which are circumferentially arranged on the inner cylindrical wall and have a first injection angle with respect to a horizontal plane containing at least one of the nozzles, the first injection angle being in a range of 40 to 50 degrees, wherein the nozzles have diameters which vary from a relatively small diameter to a relatively large diameter along the inner cylindrical wall used for outputting the working fluid to form a filtering region to capture the particles from the gas.

6. The apparatus for removing particles from a gas expelled during a treatment process by a working fluid as claimed in claim 5, wherein the sprayer is disposed in a heat treatment device.

7. The apparatus for removing particles from a gas expelled during a treatment process by a working fluid as claimed in claim 5, wherein the working fluid outputted from the nozzles are individually reached to the inner wall.

8. An apparatus for removing particles from a gas expelled during a treatment process by a working fluid, comprising:

a sprayer having an inner cylindrical wall and a plurality of nozzles which are circumferentially arranged on the inner cylindrical wall and having a first injection angle with respect to a horizontal plane containing at least one of the nozzles, the first injection angle being in a range of 40 to 50 degrees, used for outputting the working fluid to form a filtering region to capture the particles from the gas, wherein the nozzles have a second injection angle with respect to the axis, the second injection angle being in the range of 3 to 10 degrees.

9. The apparatus for removing particles from a gas expelled during a treatment process by a working fluid as claimed in claim 5, wherein the working fluid is water.

10. An apparatus for proceeding heat-treating step, comprising:

a heat treatment unit used for proceeding heat-treating step, expelling a gas containing particles;

a working fluid; and a sprayer having an inner cylindrical wall and a plurality of nozzles which are circumferentially arranged on the inner cylindrical wall with respect to an axis of the inner cylindrical wall and used for outputting the working fluid to form a filtering region to capture the particles, wherein the nozzles have a first injection angle with respect to the axis, the first injection angle being in a range of 40 to 50 degrees and a second injection angle with respect to the axis, the second injection angle being in a range of 3 to 10 degrees.

11. A method for removing particles from a gas expelled during a treatment process by a working fluid, comprising the processes of:

spraying the working fluid to form a filtering region by a plurality of nozzles which are circumferentially arranged about an axis of an inner cylindrical wall and angled with respect to a coplanar surface containing the axis and one of the nozzles at the range of 3 to 10 degrees; and inducing the gas passed through the filtering region so that the particles are removed by the working fluid outputted from the nozzles.

12. The method for removing particles from a gas expelled during a treatment process by a working fluid as claimed in claim 11, wherein the nozzles are disposed in a heat treatment device.

13. The method for removing particles from a gas expelled during a treatment process by means of a working fluid as claimed in claim 11, wherein the working fluid is water.

14. An apparatus for removing particles from a gas expelled during a treatment process by a working fluid, comprising:

a sprayer having an inner cylindrical wall and a plurality of nozzles which are circumferentially arranged about an axis of the inner cylindrical wall and angled with respect to a coplanar surface containing the axis and one of the nozzles at the range of 3 to 10 degrees, used for outputting the working fluid to form a filtering region to capture the particles from the gas.

15. The apparatus for removing particles from a gas expelled during a treatment process by a working fluid as claimed in claim 14, wherein the sprayer is disposed in a heat treatment device.

16. The apparatus for removing particles from a gas expelled during a treatment process by a working fluid as claimed in claim 14, wherein the working fluid is water.

17. The method for removing particles from a gas expelled during a treatment process by means of a working fluid as claimed in claim 3, wherein the water streams outputted from all the nozzles do not interfere with other water streams.

18. The method for removing particles from a gas expelled during a treatment process by means of a working fluid as claimed in claim 8, wherein the water streams outputted from all the nozzles do not interfere with other water streams.

19. The method for removing particles from a gas expelled during a treatment process by means of a working fluid as claimed in claim 1, wherein the nozzles have a second injection angle with respect to the axis, the second injection angle being in a range of 3 to 10 degrees.

20. The apparatus for removing particles from a gas expelled during a treatment process by a working fluid as claimed in claim 5, wherein the nozzles have a second injection angle with respect to the axis, the second injection angle being in the range of 3 to 10 degrees.

21. The apparatus proceeding heat-treating step as claimed in claim 14, wherein the nozzles have a first injection angle with respect to the axis, the first injection angle being in a range of 40 to 50 degrees and a second injection angle with respect to the axis, the second injection angle being in a range of 3 to 10 degrees.

22. The method for removing particles from a gas expelled during a treatment process by means of a working fluid as claimed in claim 19, wherein the water streams outputted from all the nozzles do not interfere with other water streams.

23. The method for removing particles from a gas expelled during a treatment process by means of a working fluid as claimed in claim 20, wherein the water streams outputted from all the nozzles do not interfere with other water streams.

* * * * *